Patented July 7, 1925.

1,545,318

UNITED STATES PATENT OFFICE.

JOHN C. HEBDEN, OF NEW YORK, N. Y., ASSIGNOR TO HEBDEN SUGAR PROCESS CORPORATION, OF NEW YORK, N. Y., A CORPORATION OF NEW YORK.

SUGAR PURIFICATION.

No Drawing.   Application filed May 3, 1921. Serial No. 466,493.

*To all whom it may concern:*

Be it known that I, JOHN C. HEBDEN, a citizen of the United States, residing at New York city, in the county of New York and State of New York, have invented new and useful Improvements in Sugar Purification, of which the following is a specification.

The present invention relates to the purifying of cane sugar products generally and more especially cane juices, crude and semi-refined sugars, crude syrups, molasses or the like, and its object is to provide a novel and improved process which enables the greatest portion of the impurities, particularly the coloring matter and the gums, to be removed from the cane juice, sugar syrup or other sugar products, with great facility and at much less expense than that involved in the sugar refining practices heretofore employed and which, moreover, avoids loss of sugar or the addition of any injurious substance to the juice or syrup and enables a sugar product to be obtained which is superior to that obtainable by the methods generally practiced in sugar refining.

Sugar juice as produced on the plantation varies in its composition, due to variation in the character and variety of the cane, to the conditions of the season and other causes, but the impurities contained in the juice may be roughly classified as gums or similar carbohydrates, waxes or similar fatty bodies, proteins or albuminous substances, either free or combined and which are either present in the cane or are due to decomposition, coloring matters which have been described as chlorophyll, anthocyanin, saccharetin, polyphenols, and tannin-like bodies. These impurities, together with the inorganic substances, soluble in water and combined with the substances pressed from the cane, constitute the heterogeneous mixture which exists in varying quantities and proportions in the juice pressed and extracted from the cane. Potassium is the major constituent of the inorganic compounds derived from the cane, although calcium and magnesium also form important constituents of these inorganic compounds.

After the juice is concentrated and raw sugar is made therefrom, remnants of the impurities of the original raw juice, together with the non-crystallizable sugars, are found adhering to the sugar crystals, so that the problem of purifying either the juice obtained from crushing the cane or the syrup consisting of the solutions of sugar used in the refining operation, is identical, varying only in the amount of impurities that require removal.

The process heretofore used generally in the manufacturing of crystallized sugar from sugar cane, consisted, first, in crushing the cane to obtain a thin juice containing, under the best practice, from 90 to 95% of all the sugar substance in the cane; second, defecating and clarifying the juice to prepare it for evaporation to a syrup which will yield crystallized sugar; third, evaporating or striking to crystallize the sugar; and, fourth, crystallizing the sugar and washing or separating from the crystals the non-crystallizable sugar and other substances in the form of molasses. The sugar thus produced on the plantation is termed raw sugar, such sugar containing from 94% to 96% of crystallizable sugar and this raw sugar is subsequently refined by a process which usually consists of the following steps: First, purging or affining in a centrifugal machine to remove, as far as possible, the impurities adhering in the form of molasses; second, dissolving the purged sugar to a solution containing approximately from 50% to 60% crystallizable sugar; third, defecating or clarifying this solution; fourth, filtering this solution to remove suspended and other matters; fifth, treating the solution with bone char for the removal of color and further clarification; sixth, evaporating to crystallization; and seventh, separating in a centrifugal machine the crystals from the non-crystallizable sugars contained in the molasses, preparatory to drying the crystals.

The present invention comprehends a simple, efficient and inexpensive process of removing the impurities contained in the sugar juices, the sugar syrup or other sugar products, by chemical means not heretofore employed. It is based on the discovery that the coloring matters in the sugar juice or syrup belong to two distinct classes of dyestuffs, i. e., to the basic dyes and to the mordant dyeing coloring matters, and it comprehends the employment of substances which act as mordants and will combine chemically with and thereby take up these dyestuffs and form true color compounds therewith, thus removing these coloring matters from the juice or syrup. The present invention is also based on the further discovery that these mordants possess the property of combining with the waxes or fatty matters contained in the juice or syrup, as well as with the gums and with the protein or albuminous substance. By treating sugar juices or syrups with mordants prepared in accordance with the present invention, it is rendered possible to remove 60% or more of the total color, due to the presence of the dyes which belong to the above-mentioned classes, to remove the major part of the gums and the proteins or albuminous substances and the color which is associated with these substances and to remove practically all of the waxes or fatty matters, so that after treating the juices or the syrups with these mordants, it is possible, by the use of simple chemical substances used in very small percentages, or by the use of small percentages of animal or vegetable chars, to remove the color remaining in the juice or syrup. A juice or syrup thus produced is brilliant and water-white and is freer from gum and similar substances, as compared with juice or syrup obtainable by the refining methods heretofore used.

In carrying out the invention, it has been recognized that it will be necessary, in order to avoid increasing the content of inorganic or soluble non-sugar substances, to use only those substances which are insoluble in water or sugar juices or syrups, or substantially so. Hence, the intentional addition of any substance to the juice or syrup which is soluble therein, is avoided, in consequence of which an increase in ash-forming substances and the formation and introduction of additional molasses-forming compounds in the sugar juices or syrup, are avoided. Moreover, it is a well-known fact that sugar-containing solutions interfere with many chemical reactions, they preventing some reactions completely, and in other cases, preventing the reaction from going to completion. However, by reacting with compounds insoluble in sugar solutions, as comprehended by the present invention, incomplete reaction which would leave that part of the compound introduced but not reacting as an impurity in the juices or syrups, is avoided. While sugar solutions may, to some extent, inhibit reaction on the insoluble reagents or mordants used in accordance with the present invention, yet such inhibition as may occur, will merely lower the efficiency of the reaction and would not add any impurity to the juices or syrups. It is thus rendered possible by the present invention, to treat raw juices, sugar products having a purity of 99 plus, as for example, affined sugar produced in the regular refining process, syrups from crude sugars, as well as molasses having a purity of 30 to 40 and other crude or semi-refined products.

I have found that in removing the coloring matters which I have discovered to be mordant dyeing dyestuffs and have classified them as such, and which coloring matters are or may be tannin-like bodies of polyphenols or similar bodies, that the hydroxides of any of the metals which form insoluble compounds with tannic acid can be used. However, in view of their ease of preparation and also because their compounds are non-poisonous, it is preferable to employ the hydroxides of iron, alumina and titanium, as these have been found to be particularly serviceable.

I have further found that these mordants which can be used for dyeing or fixing the dyestuffs known as basic dyes, when prepared in accordance with the present invention, can be used for removing those coloring matters contained in the sugar juices and syrups and which I have recognized and classified as belonging to the class of dyes known as basic dyestuffs. I can therefore use any of the insoluble tannates, although the tannates of iron, alumina and titanium, which are non-poisonous, are used in preference to the tannates of antimony, zinc, lead and other metals producing insoluble compounds with tannic acid. However, the insoluble ferro-cyanides and the insoluble ferri-cyanides, as well as the insoluble sulfo-cyanides are also mordants for basis dyes and I can use these latter compounds prepared, as hereinafter described, for the removal of the coloring matters which I have identified as basic dyestuffs. Other mordants for basic dyes, as, for example, lead compounds, can be used, but it is preferable to use only those compounds which are non-poisonous. It is known that the water-insoluble tannates are mordants which are capable of fixing mordant dyeing coloring matters and of combining with basic coloring matters.

I have also devised a method for producing what might be termed a synthetic fibre or a synthetic substance having the same affinity or capacity for absorbing basic dyestuffs as does wool, leather, protein and similar substances. In constructing or forming the synthetic substance, advantage is taken of the well known chemical fact that gelatine or similar nitrogenous substances can be rendered insoluble and thus precipitated by various inorganic compounds, that is salts of chromium, iron, alumina, or by organic compounds, as for instance, tannic acid or those bodies which are classed under the generic or comprehensive term, tannin, or formaldehyde and similar substances, as well as by those synthetic or manufactured products which can be used for tanning hides to produce leather, as for example, sulfonic acids of the aromatic hydrocarbons or their substituted compounds, or the condensation products derived from these, either with or without the use of formaldehyde or similar condensing agents. Also, the products derived from the sulfite waste liquors of the sulfite wood pulp manufacturing industry commercially known as lignone, sulfite waste and similar denominations. I have found that these insoluble compounds, when prepared and used in accordance with the present invention, not only have great decolorizing power upon sugar juices or syrups, because of their functions as mordants, but they have a particular affinity, attraction or absorbing power for waxes and fatty compounds and for gums and proteins.

In using the compounds described above, good results can be obtained by adding the same as a simple washed hydroxide of the metal used, or as a simple precipitated and washed tannate, ferro-cyanide, ferri-cyanide or sulfo-cyanide or insoluble glue or gelatine compounds. I have found, however, that the efficiency of the process is greatly increased and the quantity of mordant required is greatly reduced, if these mordants or decolorizing agents are prepared on a substrate. By thus preparing these mordants, a greater surface for contact is obtained and a smaller or less percentage of mordant is required for the removal of the coloring matter and other impurities. Substances which I can use as substrates suitable for this purpose are fuller's earth, kaolin or china clay, ground silica, dry alumina hydrate of the variety insoluble in water, kieselguhr or infusorial earth, ground wood or wood flour and any other finely divided substance which is insoluble in water and upon which the mordant can be precipitated.

The process is preferably carried out substantially as follows: A substrate is prepared by precipitating thereon a small percentage of the hydroxide of the metal selected, or of an insoluble tannate or of an insoluble gelatine or glue compound, the percentage employed being calculated from the quantity and quality of the sugar juice, syrup or other sugar products to be treated. These compounds formed upon the substrate are thoroughly washed with boiling water until there can be no more substance dissolved therefrom. They are then prepared as a cake containing, for example, from 60% to 70% of water, or they may be dried, if desired. As the case may require, one of these prepared substrates or a combination of one substrate with one or two of the other above mentioned, is added to the sugar juice or syrup, the latter is thoroughly stirred to cause the compound to mix therewith and the mixture is allowed to react for about one-half hour at a temperature preferably of from 100 degrees to 120 degrees F. A longer treatment can be given, as required, but in order to prevent inversion due to the action of heat upon the juice or syrup, it is desirable to treat the latter for a time just sufficient to take up or fix the coloring matters or to take up and remove the gums or waxes. A syrup thus treated, as compared with syrup made from the same grade of raw sugar, will filter at least 100 times faster than the syrup not so treated, it will have a lighter color, 60% or more of the coloring matter being removed, and it will have a brilliancy which is not possessed by the product obtainable by the method generally practiced in sugar refining.

As examples of the methods which may be employed in preparing the substrates for use as above described, the following will serve:

To prepare the substrate containing the hydroxides of the metals the preparation of the substrate with aluminum hydroxide will serve.

One suspends in water infusorial earth, fuller's earth or other insoluble substance in quantity equal to say 2½% of the sugar to be treated. There is then added to this suspension sufficient sulfate of alumina to precipitate in and on the substrate say ¼ of 1% of the weight of the sugar to be treated of aluminum hydroxide. The precipitation is performed preferably hot by sodium carbonate or any alkali which will transpose aluminum sulfate and precipitate the hydroxide leaving a soluble sulfate.

If it is desired to have combined with the hydroxide an insoluble oleate or similar compound, a small quantity of soap made from oleic acid or similar fatty acid or from a sulfonated oil, is added to the suspension before the addition of sulfate of alumina in order to precipitate the insoluble alumina soap, and an alkali is then added to precipitate the aluminum hydroxide.

The substrates prepared as above described are washed with hot water to remove all products soluble therein, are filter pressed and are then ready for use.

The substrate prepared with aluminum hydroxide alone would correspond to a textile fabric mordanted with alumina in its reaction upon coloring matters. While the substrate prepared with aluminum hydroxide and insoluble fatty compound would correspond to the mordant produced upon cotton by the use of oil, soluble oil or alizarine assistant and alumina mordants.

To prepare similar mordants with the hydroxides of other metals, as for instance, iron, titanium, zinc, etc., the same procedure is followed.

In order to prepare the substrates containing insoluble tannates, the following procedure is used:

To a suspension of infusorial earth, fuller's earth or any suitable insoluble finely divided substance there is added the salt of the metal, the insoluble tannate of which is to be produced. This metal is then precipitated upon the substrate as hydroxide as described in the method given above for aluminum hydroxide. A solution of tannic acid or any suitable tannin is then added to the substrate upon which the hydroxide is precipitated. It is not necessary to wash out the products of the first reaction. Sufficient tannic acid or tannate is added to the prepared hydroxide to combine with the same and leave a slight excess of tannic acid or tannin. The insoluble tannate thus prepared is then washed as described in the method for the preparation of the substrate with aluminum hydroxide and is then ready for use. Some insoluble tannates can be produced by adding to the substrate the salt of the metal whose tannate is required and adding to this mixture the tannic acid or tannin precipitating thus the insoluble tannate.

If it is desired to produce a mixture of insoluble tannate and hydroxide sufficient tannin or tanic acid to completely combine with the hydroxide produced is avoided. There is thus formed the mixture required. In case an insoluble fatty compound is required, either mixed with the insoluble tannate alone or mixed with the insoluble tannate and hydroxide, the insoluble compound of the fatty compound is formed as described above in preparing such a mixture with the hydroxide. It is thus evident that one can by following this procedure easily prepare an insoluble tannate on the substrate or an insoluble tannate and insoluble hydroxide, or an insoluble tannate and an insolute fatty compound, or a mixture of the three if desired or required.

As stated above, the insoluble tannates are useful and have the property of fixing the basic dyes, so that the mixture of insoluble tannate and hydroxide would combine in one substrate the property of fixing both the mordant dyeing and the basic dyestuffs.

The preparation of the other insoluble compounds which have the property of mordants for basic dyestuffs as enumerated above is made in exactly the same manner as is described for the production of the insoluble tannates. In each case, however, the substrate is washed until it is free from material soluble in water and is then ready for use.

In preparing the substance which is hereinabove designated as synthetic fibre, the procedure may be as follows: To a suspension of infusorial earth, fuller's earth or any finely divided substance insoluble in water, there is added ¼ of 1% of the amount of sugar to be treated of a good quality of glue. To this mixture at a temperature at or near the boiling point of water, there is added sufficient tannic acid, tannin or any of the substances enumerated in the above description of the so-called synthetic fibre, to coagulate or precipitate the gelatine or glue substance. The compound thus formed can then be washed with water until all the material soluble therein is removed or can be treated with the salt of a metal as, for instance, aluminum sulfate in order to harden the compound formed as described above, or it may be treated with the salt of a metal as, for instance, aluminum sulfate, in excess in order to harden the product as described and the excess of the compound thus used for hardening can be precipitated as hydroxide as described for the preparation of aluminum hydroxide. An insoluble fatty compound can be prepared in conjunction with the so-called synthetic fibre as in the case of the simple hydroxide prepared on the substrate, or in the case of the insoluble tannate.

The substrates thus prepared react toward the basic coloring matter as does wool, leather, etc., and when hardened by the use of the salt of a metal, as for instance, aluminum sulfate, they react as a mordanted wool fibre, and thus have the property of taking up from the solutions both the basic and mordant dyeing dyestuffs.

In the preparation of all the varieties of substrates described it is essential and desirable to wash thoroughly so that no soluble substances will be added to the sugar syrup or juices; otherwise, impurities will be introduced into the sugar products.

What is claimed is:—

1. The herein described process of purifying sugar juices, syrups and other sugar solutions which comprises introducing into such a solution a dye-mordant which is insoluble in water and which will combine with basic dyestuffs.

2. The herein described improvement in the purification of sugar solutions which comprises introducing into such a solution a dye mordant which is substantially insoluble in water and will fix basic coloring matters and is absorptive to mordant dyeing coloring matters.

3. The improvement in the purification of sugar juices, syrups and other sugar products which comprises adding thereto a compound which is substantially insoluble in water and is capable of fixing basic and mordant dyeing coloring matters and is absorptive to albuminous substances.

4. The herein described process of purifying sugar juices, syrups and other sugar solutions which comprises adding directly to such a solution a water insoluble mordant which is absorptive to basic and mordant-dyeing coloring matters and to albuminous substances.

5. The improvement in the purification of sugar juices, syrups and other sugar solutions which comprises introducing into such a solution a water insoluble metallic hydroxide and a water insoluble compound which is a mordant for basic dyestuffs.

6. The improvement in the purification of sugar juices, syrups and other sugar solutions which comprises introducing into such a solution a mordant comprising a water insoluble tannate.

7. The improvement in the purification of sugar juices, syrups and other sugar solutions which comprises introducing into such a solution a tannin compound which is insoluble in water and will combine with mordant-dyeing coloring matters and basic dyeing coloring matters.

8. The improvement in the purification of sugar juices, syrups and other sugar solutions which comprises adding thereto a substrate consisting of a communited inert substance insoluble in water and having incorporated therewith a compound which is insoluble in water and which will combine with basic dyestuffs.

9. The improvement in the purification of sugar juices, syrups and other sugar solutions which comprises treating such a solution with a substrate having incorporated therewith a dye-mordant which is insoluble in water and which will combine with basic dye-stuff.

10. The improvement in the purification of sugar juices, syrups and other sugar solutions which comprises treating such a solution with a substrate having incorporated therewith a dye-mordant which is insoluble in water and will fix basic dyeing coloring matters and will take up mordant dying coloring matters.

11. The improvement in the purification of sugar juices, syrups and other sugar solutions which comprises introducing into such a solution a mordant comprising a precipitate of a compound of protein and a tannin which is insoluble in water.

12. The improvement in the purification of sugar juices, syrups and other sugar solutions which comprises introducing into such a solution a substrate insoluble in water and having incorporated therewith a mordant comprising a precipitate of a protein substance which is insoluble in water.

13. The improvement in the purification of sugar juices, syrups and other sugar solutions which comprises introducing into such a solution a mordant comprising a water insoluble tannate of a metal.

14. The improvement in the purification of sugar juices, syrups and other sugar solutions which comprises introducing into such a solution a water insoluble compound of a protein substance and a tannin substance.

15. The improvement in the purification of sugar juices, syrups and other sugar solutions which comprises treating such a solution with a substrate having incorporated therewith a mordant comprising a tannin compound insoluble in water.

16. The improvement in the purification of sugar juices, syrups and other sugar solutions which comprises treating such a solution with a substrate having incorporated therewith a compound of a protein substance and a tannin insoluble in water.

17. The improvement in the purification of sugar juices, syrups and other sugar solutions which comprises treating such a solution with a substrate having incorporated therewith a tannate of a metal insoluble in water and a compound of a protein substance and a tannin insoluble in water.

18. The improvement in the purification of sugar juices, syrups and other sugar solutions which comprises treating such a solution with a compound of a protein substance insoluble in water and a tannate of alumina.

19. The improvement in the purification of sugar juices, syrups and other solutions which comprises treating such a solution with a metallic hydroxide which is a mordant for mordant-dyeing dyestuffs and a tannate.

20. The improvement in the purification of sugar juices, syrups and other sugar solutions which comprises treating such a solution with a metallic hydroxide which is a mordant for mordant-dyeing dyestuffs, and a water insoluble compound of a protein substance and a tannin, which compound is insoluble in water.

21. The improvement in the purification of sugar juices, syrups and other sugar solutions which comprises treating such a solution with a mixture of metallic hydroxide which is a mordant for mordant-dyeing dyestuffs, a water insoluble compound of a protein substance, and a water insoluble tannate.

22. A reagent for purifying sugar juices, syrups, and other sugar solutions which comprises a water insoluble compound of a protein substance and a metallic hydroxide.

23. A reagent for purifying sugar juices, syrups and other sugar solutions comprising a water insoluble compound having the properties of fixing mordant-dyeing coloring matters and of chemically combining with basic coloring matters.

24. A reagent for purifying sugar juices, syrups and other sugar solutions comprising a water insoluble compound of a protein substance and a water insoluble tannate.

25. A reagent for purifying sugar juices, syrups and other sugar solutions comprising a water insoluble substrate having incorporated therewith a water insoluble compound of a protein substance and a tannin substance.

26. A reagent for purifying sugar juices, syrups and other sugar solutions comprising a water-insoluble tannate of a metal and a water-insoluble protein compound.

27. A reagent for purifying sugar juices, syrups and other sugar solutions comprising a metallic hydroxide which is a mordant for mordant-dyeing dyestuffs and a water insoluble tannate.

28. A reagent for purifying sugar juices, syrups and other sugar solutions comprising a metallic hydroxide which is a mordant for mordant-dyeing dyestuffs and a water protein insoluble compound which is a mordant for basic dyestuffs.

29. A reagent for purifying sugar juices, syrups and other sugar solutions comprising a metallic hydroxide which is a mordant for mordant-dyeing dyestuffs, a water insoluble compound of a protein substance, and a water insoluble tannate.

30. A reagent for purifying sugar juices, syrups and other sugar solutions comprising a water insoluble substrate having incorporated therewith a water insoluble tannate.

31. A reagent for purifying sugar juices, syrups and other sugar solutions comprising a water insoluble substrate having incorporated therewith a metallic hydroxide which is a mordant for mordant-dyeing dyestuffs, and a water insoluble tannate.

32. A reagent for purifying sugar juices, syrups and other sugar solution comprising a water insoluble substrate having incorporated therewith a metallic hydroxide which is a mordant for mordant-dyeing dyestuffs, a water insoluble tannate and an insoluble compound of a protein substance and a tannin substance.

In testimony whereof I have hereunto set my hand in presence of two subscribing witnesses.

JOHN C. HEBDEN.

Witnesses:
C. A. BATEMAN,
CHAS. S. HYER.